(12) United States Patent
Maruyama et al.

(10) Patent No.: US 12,168,450 B2
(45) Date of Patent: Dec. 17, 2024

(54) SAFETY SUPPORT DEVICE

(71) Applicant: HONDA MOTOR CO., LTD., Tokyo (JP)

(72) Inventors: Masaki Maruyama, Saitama (JP); Junichi Sakamoto, Saitama (JP); Yuichiro Shimura, Saitama (JP); Toru Ezaki, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 98 days.

(21) Appl. No.: 18/184,685

(22) Filed: Mar. 16, 2023

(65) Prior Publication Data
US 2023/0311921 A1    Oct. 5, 2023

(30) Foreign Application Priority Data

Mar. 29, 2022  (JP) ................. 2022-054576

(51) Int. Cl.
*B60W 50/14*  (2020.01)
*B60Q 5/00*  (2006.01)
*B60W 60/00*  (2020.01)
*G06V 20/56*  (2022.01)
*G06V 20/58*  (2022.01)

(52) U.S. Cl.
CPC ............ *B60W 50/14* (2013.01); *B60Q 5/006* (2013.01); *B60W 60/0015* (2020.02); *G06V 20/56* (2022.01); *G06V 20/58* (2022.01); *B60W 2540/223* (2020.02); *B60W 2540/229* (2020.02); *B60W 2554/4041* (2020.02); *B60W 2710/30* (2013.01)

(58) Field of Classification Search
CPC ............ B60W 50/14; B60W 60/0015; B60W 2540/223; B60W 2554/4041; B60W 2710/30; B60Q 5/006; G06V 20/56; G06V 20/58
See application file for complete search history.

(56) References Cited

U.S. PATENT DOCUMENTS 8,978,797 B2 *  3/2015  Takewaka ............... B62J 50/30
                                          340/474
10,154,363 B2 * 12/2018  Ishida ..................... G01S 7/539
2003/0125855 A1 *  7/2003  Breed ..................... B60Q 1/143
                                          701/36

(Continued)

FOREIGN PATENT DOCUMENTS

JP       H05250589 A     9/1993

*Primary Examiner* — Mohamed Barakat
(74) *Attorney, Agent, or Firm* — CKC & Partners Co., LLC

(57) ABSTRACT

A safety support device includes an object detection camera and a radar device, which serve as detectors, and a controller that controls a dual-purpose speaker and a dual-purpose speaker, which serve as three-dimensional sound outputters, and a monaural speaker that serves as a sound outputter, based on detection information of a monitoring camera that serves as a monitor. The controller selects, in accordance with the positions of the ears of a driver, which are detected by the monitoring camera, whether to cause the dual-purpose speaker and the dual-purpose speaker to output a three-dimensional sound or to cause the dual-purpose speaker, the dual-purpose speaker, and the monaural speaker to output a sound.

7 Claims, 7 Drawing Sheets

(56) References Cited

U.S. PATENT DOCUMENTS

| | | | |
|---|---|---|---|
| 2005/0280519 A1* | 12/2005 | Nagata | B60Q 9/008 340/438 |
| 2008/0118074 A1* | 5/2008 | Takada | G01S 19/49 381/17 |
| 2010/0085176 A1* | 4/2010 | Flick | B60K 28/066 340/439 |
| 2018/0132052 A1* | 5/2018 | Muench | H04R 5/04 |

* cited by examiner

FIG. 2
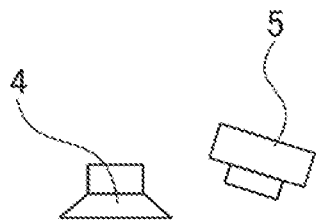
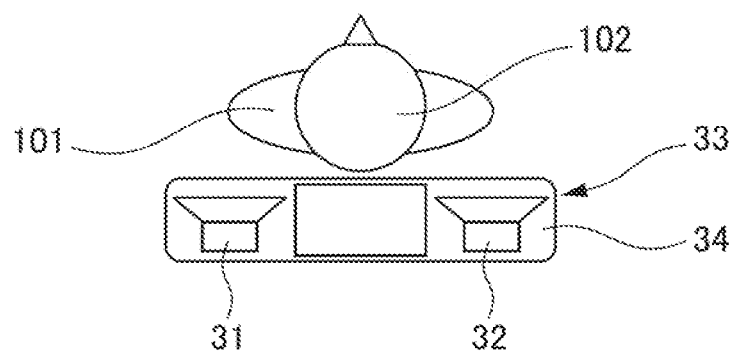

SAFETY SUPPORT DEVICE ──

This application is based on and claims the benefit of priority from Japanese Patent Application 2022-054576, filed on 29 Mar. 2022, the content of which is incorporated herein by reference.

BACKGROUND OF THE INVENTION

Field of the Invention

The present invention relates to a safety support device for a vehicle.

Related Art

Recently, initiatives to provide access to sustainable transportation systems that take into consideration those people who are in vulnerable situations among traffic participants have gained momentum. To achieve such initiatives, research and development for further improving safety and convenience in traffic have been underway through research and development relating to preventive safety technologies.

Regarding such preventive safety technologies as described above, such a safety support device for a vehicle is known that notifies, with a sound, a driver of a risk of collision with another vehicle or another object (for example, see Japanese Unexamined Patent Application, Publication No. H5-250589). In Japanese Unexamined Patent Application, Publication No. H5-250589, speakers provided closer to the ears of the driver output a three-dimensional sound that localizes a warning sound in a direction of a risk target around the vehicle itself.

Patent Document 1: Japanese Unexamined Patent Application, Publication No. H5-250589

SUMMARY OF THE INVENTION

Since a three-dimensional sound makes it possible to localize a sound image at a desired position, it is possible to allow a driver to sense the location at which the sound has been issued. However, one premise for correct functioning of a three-dimensional sound is that the positions of the ears of a driver are proximal to the positions of the speakers, and are in an appropriate positional relationship with the speakers. However, since the position of the head of the driver frequently changes while driving, the driver may not appropriately recognize the location at which a sound has been issued when the positions of the speakers relative to the driver become inappropriate.

An object of the present invention is to provide a safety support device that outputs a three-dimensional sound based on a state of a driver to make it possible to appropriately and understandably notify the driver of a risk of collision.

(1) The present invention is directed to a safety support device (for example, a safety support device 1 described later) for a vehicle (for example, a vehicle 100 described later), the safety support device including: a detector (for example, an object detection camera 21, a radar device 22, or both described later) that detects a position of an object (for example, an object 150 described later) around the vehicle; three-dimensional sound outputters (for example, a dual-purpose speaker 31 and a dual-purpose speaker 32 described later) that output a three-dimensional sound to allow the driver (for example, a driver 101 described later) to sense a direction in which the object exists; a sound outputter (for example, a monaural speaker 4 described later) that outputs a sound allowing the driver to sense the existence of the object; a monitor (for example, a monitoring camera 5 described later) that monitors a change in positions of ears of the driver; and a controller (for example, a controller 10 described later) that controls the three-dimensional sound outputters and the sound outputter, based on detection information of the detector and the monitor, in which the controller selects, in accordance with the positions of the ears of the driver, the positions being detected by the monitor, whether to cause the three-dimensional sound outputters to output the three-dimensional sound or to cause the sound outputter to output the sound.

Thereby, when the ears of the driver lie at appropriate positions, it is possible to separately use a three-dimensional sound that makes it possible to localize a sound image at a desired position and a sound that makes it possible to notify the driver of the existence of an object even when the ears of the driver lie at positions that are not appropriate for using a three-dimensional sound, in accordance with the positions of the ears of the driver. Therefore, it is possible to avoid the occurrence of such a situation that a sound image using a three-dimensional sound is not appropriately localized due to the positions of the ears, making it possible to achieve effective notification processing in accordance with the positions of the ears of the driver.

(2) In the safety support device according to (1), the sound that the sound outputter outputs may be a monaural sound or a stereo sound that is not a three-dimensional sound.

Thereby, since a three-dimensional sound is highly dependent on the three-dimensional sound outputters and the positions of the ears, using a monaural sound or a stereo sound that is not a three-dimensional sound makes it possible to appropriately allow the driver to sense the existence of an object even when the positions of the ears of the driver have significantly changed.

(3) In the safety support device according to (1) or (2), the controller may cause the three-dimensional sound to be outputted when an orientation of a head of the driver, the orientation being detected by the monitor, when seen in a plan view lies within a predetermined angle that is set beforehand (for example, a predetermined angle α described later) and may cause the sound to be outputted when the orientation lies outside the predetermined angle.

Thereby, detecting a change in the positions of the ears based on the angle of the orientation of the head makes it possible to appropriately perform switching between a three-dimensional sound and a sound.

(4) In the safety support device according to any one of (1) to (3), the three-dimensional sound outputters may be respectively provided, on a left side and a right side, with respect to the driver, to a backrest or a headrest (for example, a headrest 34 described later) of a seat (for example, a seat 33 described later) for the driver.

Thereby, since the three-dimensional sound outputters are respectively disposed at positions closer to the ears of the driver, it is possible to more accurately present a three-dimensional sound to the driver.

(5) In the safety support device according to any one of (1) to (4), the plurality of three-dimensional sound outputters (for example, the dual-purpose speaker 31 and the dual-purpose speaker 32 described later) may simultaneously output and present the three-dimensional sound, and the three-dimensional sound outputters may each also serve as the sound outputter that outputs the sound, instead of the three-dimensional sound.

Thereby, it is possible to reduce the number of sound outputters that do not output a three-dimensional sound, making it possible to achieve reductions in manufacturing cost and in a space necessary for achieving such a safety support device.

(6) In the safety support device according to any one of (1) to (5), the sound outputter may be provided in plural number (for example, the dual-purpose speaker 31, the dual-purpose speaker 32, and the monaural speaker 4 described later) in different directions when seen from the driver, and the controller may select one sound outputter corresponding to a direction of the object from among the plurality of sound outputters to output the sound.

Thereby, even when no three-dimensional sound is used, it is possible to allow the driver to sense the feel of the direction of an object from the sound outputter corresponding to the direction of the object.

(7) In the safety support device according to any one of (1) to (6), the safety support device may further include a sight line monitor (for example, the monitoring camera 5 described later) that monitors a direction of a sight line of the driver, in which the controller may determine, based on detection information of the detector and the sight line monitor, whether the driver is visually recognizing the object, and, when it is determined that the driver is visually recognizing the object, may reduce or stop the outputting of the three-dimensional sound or the sound.

Thereby, since it is not necessary, when the driver is recognizing an object, to present its existence to the driver, a three-dimensional sound and a sound that are less necessary for the driver will not be outputted, making it possible to reduce inconveniences.

According to the present invention, it is possible to provide a safety support device that outputs a three-dimensional sound based on a state of a driver to make it possible to appropriately and understandably notify the driver of a risk of collision. Accordingly, the present invention also makes it possible to contribute to the development of sustainable transportation systems.

BRIEF DESCRIPTION OF THE DRAWINGS

FIG. 2 is a schematic view illustrating a positional relationship among dual-purpose speakers and a monaural speaker of the safety support device according to the present embodiment;

DETAILED DESCRIPTION OF THE INVENTION

An embodiment of the present invention will now be described herein with reference to the accompanying drawings.

Figure 1:
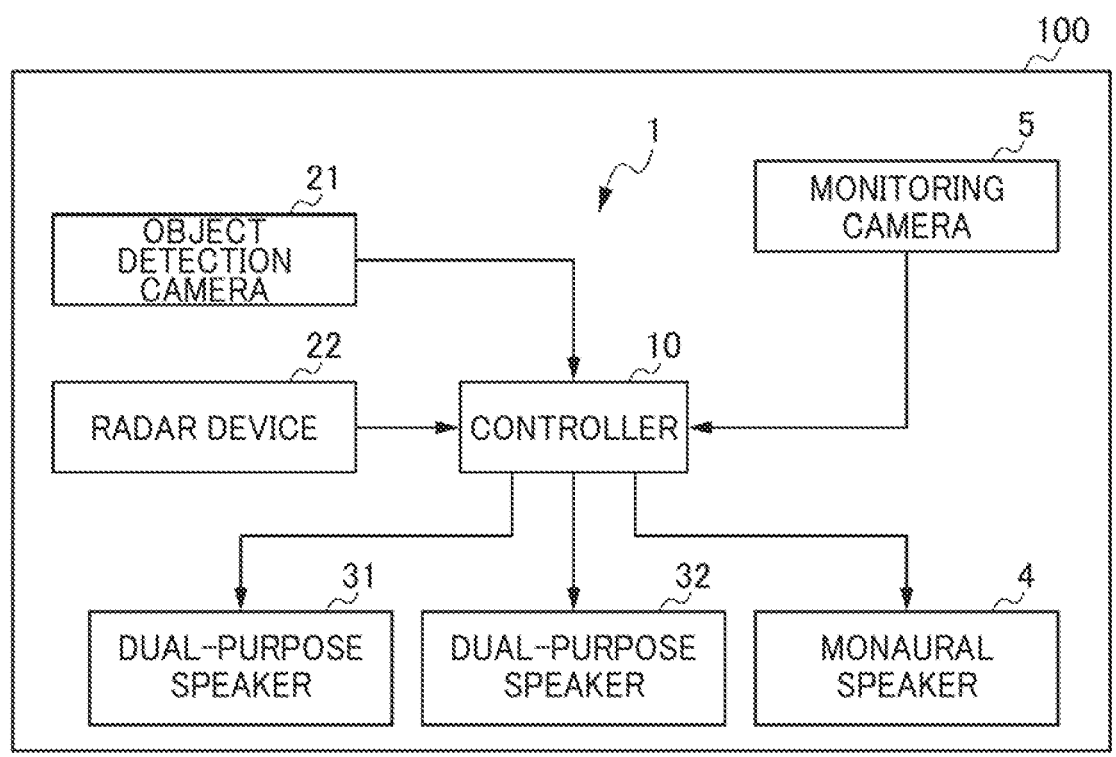
FIG. 1 is a block diagram illustrating a configuration of a safety support device according to an embodiment of the present invention.

FIG. 1 is a block diagram illustrating a configuration of a safety support device 1 according to an embodiment of the present invention. The safety support device 1 is a system mounted in a vehicle 100 to notify a driver of a risk of collision. The safety support device 1 includes an object detection camera 21, a radar device 22, a dual-purpose speaker 31, a dual-purpose speaker 32, a monaural speaker 4, a monitoring camera 5, and a controller 10.

The object detection camera 21 serves as a detector that captures an image of a scene outside the vehicle 100 to detect an object that exists outside the vehicle 100. As an image that the object detection camera 21 has acquired is analyzed, detection information including a position, a speed, and a bearing angle of an object that exists outside the vehicle 100 is acquired.

The radar device 22 serves as a detector that sends electromagnetic waves, receives their reflective waves, and detects an object that exists outside the vehicle 100. As a reception signal of an electromagnetic wave, which the radar device 22 has acquired, is analyzed, detection information including a position, a speed, and a bearing angle of an object that exists outside the vehicle 100 is acquired.

Detection information relating to an object, which the object detection camera 21 has acquired, and detection information relating to an object, which the radar device 22 has acquired, are sent to the controller 10. Note that detecting of an object that exists outside the vehicle 100 may be performed by the object detection camera 21 solely or the radar device 22 solely.

FIG. 2 is a schematic view illustrating a positional relationship among the dual-purpose speakers 31, 32 and the monaural speaker 4 of the safety support device 1 according to the present embodiment. FIG. 2 illustrates, in a plan view, a positional relationship, inside the vehicle 100, among a driver 101, the dual-purpose speaker 31, the dual-purpose speaker 32, the monaural speaker 4, and the monitoring camera 5.

The dual-purpose speaker 31 and the dual-purpose speaker 32 serve as three-dimensional sound outputters that output a three-dimensional sound to the driver 101 and also serve as sound outputters that output a monaural sound to the driver 101. The dual-purpose speaker 31 and the dual-purpose speaker 32 are switched by the controller 10 to function as the three-dimensional sound outputters that output a three-dimensional sound or to function as the sound outputters that output a monaural sound.

The dual-purpose speaker 31 and the dual-purpose speaker 32 according to the present embodiment are disposed on a headrest 34 of a seat 33 to pinch a head 102 of the driver 101 in left and right directions. The dual-purpose speaker 31 and the dual-purpose speaker 32 are disposed to appropriately allow the driver 101 to sense a sound image with a three-dimensional sound in a state where the head 102 of the driver 101 is facing forward.

The monaural speaker 4 serves as a sound outputter that outputs a monaural sound to the driver 101. In the present embodiment, the monaural speaker 4 is disposed in front of the driver 101 sitting on the seat 33.

The monitoring camera 5 serves as a monitor that identifies the positions of the ears of the driver 101, i.e., serves as a sight line monitor that identifies the sight line of the driver 101. The monitoring camera 5 is disposed at a position at which it is possible to capture, in an image, the orientation and the sight line of the head 102 of the driver 101. In the present embodiment, the monitoring camera 5 is disposed diagonally forward right of the driver 101.

The controller 10 is a computer that controls the safety support device 1. The controller 10 is communicably coupled to electronic devices including the object detection camera 21, the radar device 22, the dual-purpose speaker 31, the dual-purpose speaker 32, the monaural speaker 4, and the monitoring camera 5. Note that the controller 10 may be directly coupled to the electronic devices, or may be coupled to the electronic devices via an electric control unit (ECU) that supervises other systems. The controller 10 itself may otherwise be an ECU.

Figure 3:
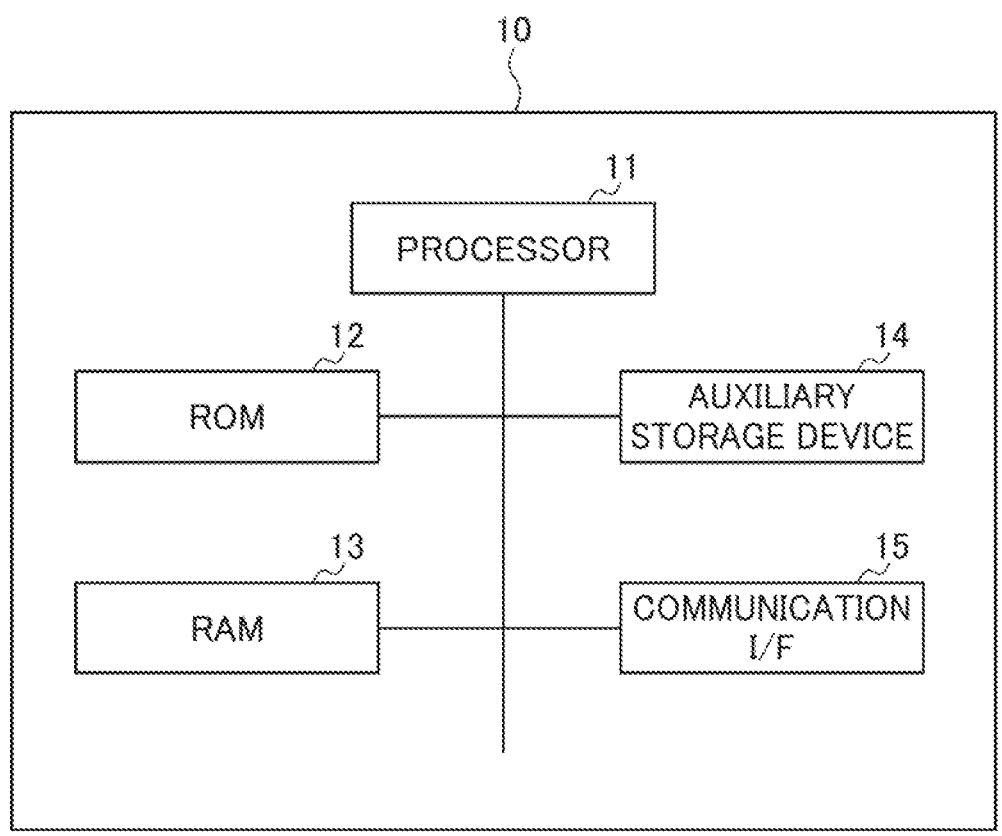
FIG. 3 is a block diagram illustrating an example of a hardware configuration of a controller of the safety support device according to the present embodiment.

FIG. 3 is a block diagram illustrating an example of a hardware configuration of the controller 10 of the safety support device 1 according to the present embodiment. Note that the hardware configuration of the controller 10 described below with reference to FIG. 3 is a mere example, and the present invention is not limited to this configuration.

The controller 10 is a computer including a processor 11, a read-only memory (ROM) 12, a random-access memory (RAM) 13, an auxiliary storage device 14, and a communication interface (I/F) 15, which are coupled to each other via a bus, for example.

The processor 11 serves as a central part of the computer that performs processing such as calculations and controls necessary for operating the safety support device 1, and that performs various calculations and processing, for example. The processor 11 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), or a field-programmable gate array (FPGA). Otherwise, the processor 11 is a combination of a plurality of those described above. Furthermore, the processor 11 may be a combination of those described above and a hardware accelerator, for example.

The processor 11 controls, based on programs such as firmware, system software, and application software stored in the ROM 12 or the auxiliary storage device 14, for example, each component to achieve various functions of the safety support device 1. Furthermore, the processor 11 executes processing described later based on the programs. Note that some or all of the programs may be incorporated into the circuitry in the processor 11.

The ROM 12 and the RAM 13 represent main storage devices for the computer that includes the processor 11 as a core component. The ROM 12 represents a non-volatile memory mainly used to read data. The ROM 12 stores the firmware, for example, among the programs described above. Furthermore, the ROM 12 further stores, for example, data that the processor 11 uses for performing various processing. The RAM 13 represents a memory used to read and write data. The RAM 13 is utilized, for example, as a work area for storing data that the processor 11 uses for performing various processing. The RAM 13 typically represents a volatile memory.

The auxiliary storage device 14 represents, for example, an electric erasable programmable read-only memory (EE-PROM), a hard disk drive (HDD), or a flash memory. The auxiliary storage device 14 stores, for example, the system software and the application software, among the programs described above. Furthermore, the auxiliary storage device 14 further stores, for example, data that the processor 11 uses for performing various processing, data generated through the processing in the processor 11, and various set values.

The communication I/F 15 represents an interface for performing communications with an external electronic device. The controller 10 acquires various detection information from the object detection camera 21, the radar device 22, and the monitoring camera 5 via the communication I/F 15 to control the dual-purpose speaker 31, the dual-purpose speaker 32, and the monaural speaker 4.

Figure 4:
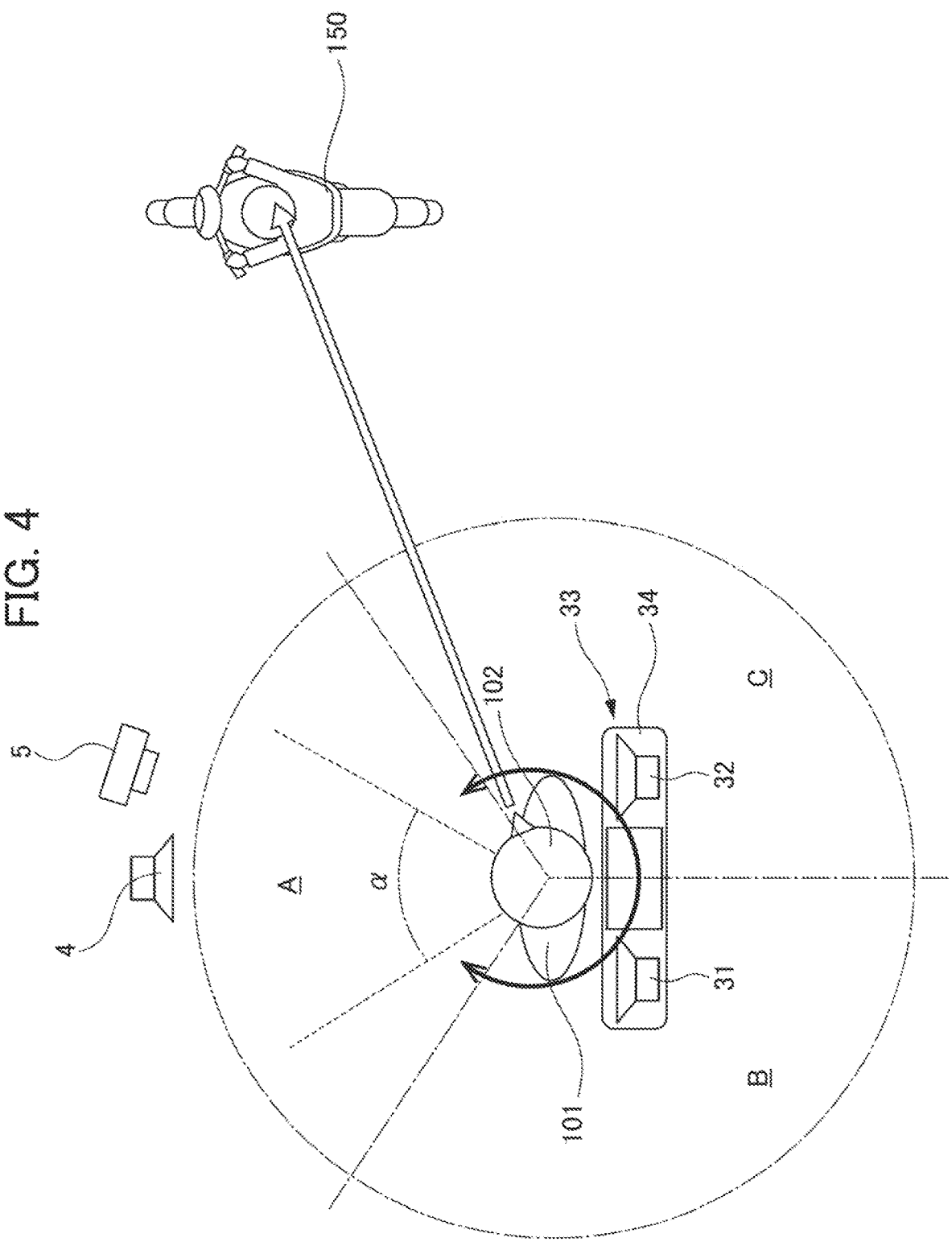
FIG. 4 is a schematic view illustrating a relationship between a direction of a sight line of a driver and notification processing in the safety support device according to the present embodiment.

Next, notification processing in the safety support device 1, which is achieved by the controller 10, will now be described below. FIG. 4 is a schematic view illustrating a relationship between the direction of the sight line of the driver 101 and the notification processing in the safety support device 1 according to the present embodiment. In FIG. 4, the orientation of the head 102 of the driver 101 is illustrated in a plan view, and the direction of the sight line of the driver 101 is indicated by a white background arrow.

When an object 150 that should be notified to the driver 101 is detected based on detection information from the detectors such as the object detection camera 21 and the radar device 22, the controller 10 executes the notification processing of notifying the driver 101, with a sound, of the existence of the object 150 based on the state of the driver 101. More specifically, the controller 10 selects, based on the positions of the ears of the driver 101, one speaker that outputs a sound from among the dual-purpose speaker 31, the dual-purpose speaker 32, and the monaural speaker 4.

The controller 10 determines the positions of the ears of the driver 101 based on the orientation of the head 102, which is acquired by analyzing an image that the monitoring camera 5 has captured. The orientation of the head 102 corresponds to the orientation of the face of the driver 101 when seen in a plan view. The controller 10 then selects to cause, when the positions of the ears of the driver 101 correspond to positions that allow appropriate sensing of a three-dimensional sound, the dual-purpose speaker 31 and the dual-purpose speaker 32 to output a three-dimensional sound and to cause, when the positions of the ears of the driver 101 do not correspond to such positions that allow appropriate sensing of a three-dimensional sound, the dual-purpose speaker 31, the dual-purpose speaker 32, or the monaural speaker 4 to output a sound that is not a three-dimensional sound. A sound that is not a three-dimensional sound is, for example, a monaural sound or a stereo sound.

A case when the controller 10 selects to cause a three-dimensional sound to be outputted will now first be described below. In the present embodiment, the controller 10 causes, when the orientation of the head 102 lies within a range of a predetermined angle α, the dual-purpose speaker 31 and the dual-purpose speaker 32 to output a three-dimensional sound. The predetermined angle α is empirically or theoretically set as a range within which the driver 101 is able to appropriately sense a three-dimensional sound that the dual-purpose speaker 31 and the dual-purpose speaker 32 output. The predetermined angle α is set as a vertical angle of a substantially fan shape, when the driver 101 serves as the center, spanning in front of the driver 101.

Next, a case when the controller 10 selects to cause a sound that is not a three-dimensional sound to be outputted will now be described below. In the present embodiment, the controller 10 causes, when the orientation of the head 102 lies outside the range of the predetermined angle α, a monaural sound to be outputted as a sound that is not a three-dimensional sound. Furthermore, the controller 10 selects, based on a positional relationship among the object 150 that is regarded as a risk target, the dual-purpose speaker 31, the dual-purpose speaker 32, and the monaural speaker 4, one speaker that outputs the monaural sound.

To determine a positional relationship with the object 150 that is regarded as a risk target, an angle range A in front of the driver 101, an angle range B diagonally rearward left of the driver 101, and an angle range C diagonally rearward right of the driver 101 are set. The angle range A is set as a range in front of the driver 101, which overlaps with the predetermined angle α, and the predetermined angle α is included within the angle range A.

When a bearing angle corresponding to the position of the object 150 that is regarded as a risk target (the direction of the object 150), when the driver 101 serves as the center, lies inside the angle range A, the monaural speaker 4 is set as a target that outputs the monaural sound. When the bearing angle corresponding to the position of the object 150 that is regarded as a risk target lies inside the angle range B, the dual-purpose speaker 31 that lies at a rear left position is set as a target that outputs the monaural sound. When the bearing angle corresponding to the position of the object 150 that is regarded as a risk target lies inside the angle range C, the dual-purpose speaker 32 that lies at a rear right position is set as a target that outputs the monaural sound.

Furthermore, in the present embodiment, whether the driver 101 is recognizing the object 150 is also set as a condition for whether the dual-purpose speaker 31, the dual-purpose speaker 32, and the monaural speaker 4 issue a warning sound. The controller 10 determines whether the driver 101 is recognizing the object 150 based on whether the direction of the sight line of the driver 101 overlaps with the position of the object 150 through analyzing an image that the monitoring camera 5 has acquired. Note that the direction of the sight line may differ from the orientation of the head 102 of the driver 101. For example, even if the head 102 of the driver 101 is facing forward, the direction of the sight line may overlap with the object 150 that lies to right.

The controller 10 determines, when the direction of the sight line of the driver 101 overlaps with the position of the object 150, that the driver 101 is recognizing the object 150, and determines to not cause a warning sound to be issued. Since, in the example illustrated in FIG. 4, the orientation of the head 102 lies outside the range of the predetermined angle α and the position of the object 150 lies inside the angle range C, the dual-purpose speaker 32 is set as a speaker that outputs a monaural sound. However, since the direction of the sight line is intersecting the object 150, no warning sound is issued.

Figure 5:
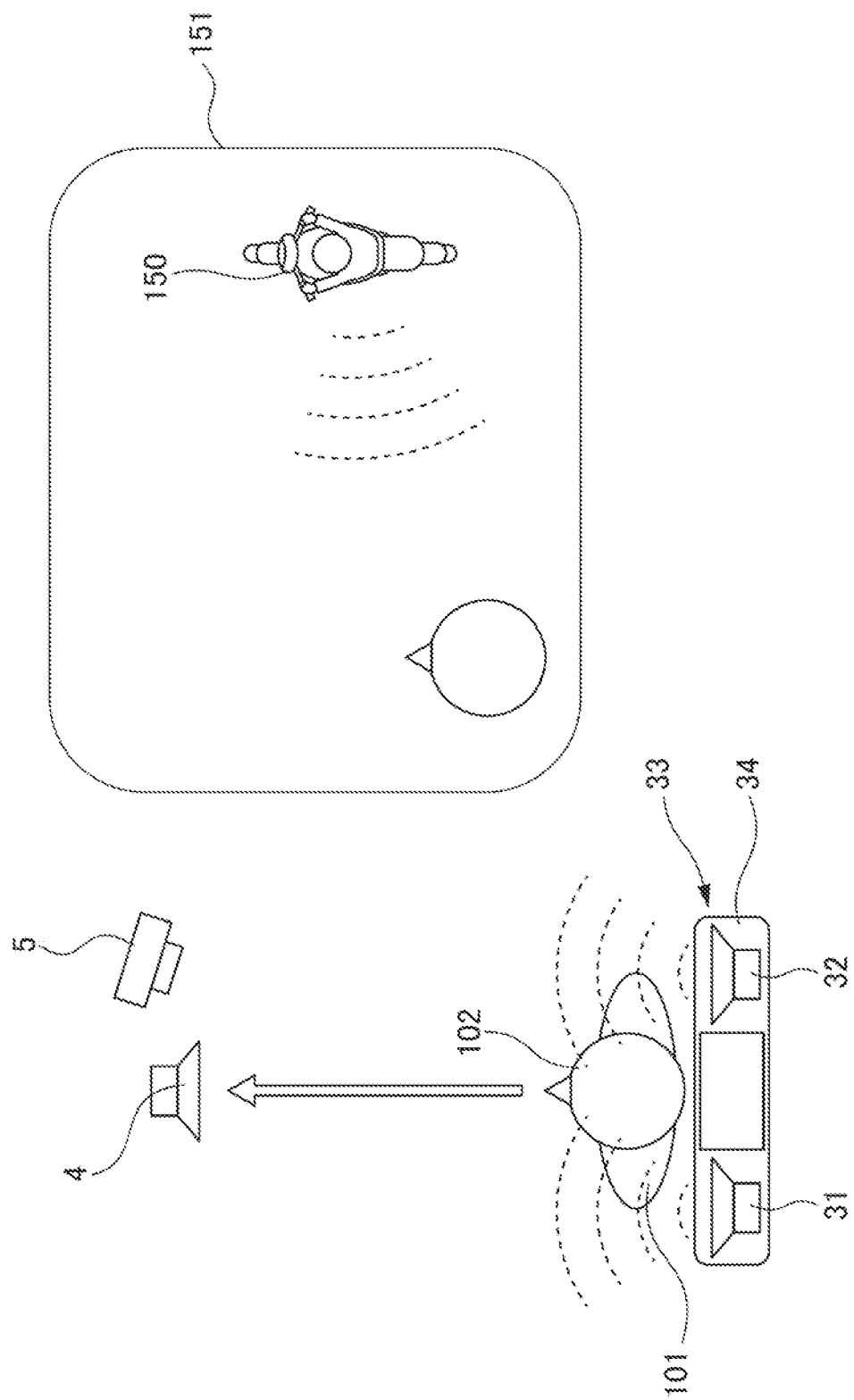
FIG. 5 is a schematic view illustrating the notification processing before the driver recognizes an object in the safety support device according to the present embodiment.

Furthermore, the controller 10 performs, after a warning sound has been issued, such a control that takes into consideration the direction of the sight line of the driver 101. Processing after a warning sound has been issued will now be described below with reference to FIG. 5. FIG. 5 is a schematic view illustrating the notification processing before the driver 101 recognizes the object 150 in the safety support device 1 according to the present embodiment.

As illustrated in FIG. 5, the controller 10 causes, when the direction of the sight line of the driver 101 does not intersect the object 150 or an expected route of the object 150, and the orientation of the head 102 of the driver 101 lies within the range of the predetermined angle α, the dual-purpose speaker 31 and the dual-purpose speaker 32 to output a three-dimensional sound. The three-dimensional sound that the dual-purpose speaker 31 and the dual-purpose speaker 32 output represents, as illustrated in an image 151 of a three-dimensional sound in FIG. 5, a sound image that allows the driver 101 to sense the position of the object 150. In this example, the three-dimensional sound is formed to allow the object 150 to lie to right of the vehicle 100. Note that, when the orientation of the head 102 of the driver 101 lies outside the range of the predetermined angle α, the controller 10 selects, based on the position of the object 150, one speaker that outputs a monaural sound, from among the dual-purpose speaker 31, the dual-purpose speaker 32, and the monaural speaker 4. For example, when the object 150 lies inside the angle range C, the dual-purpose speaker 32 is caused to output a monaural sound.

Figure 6:
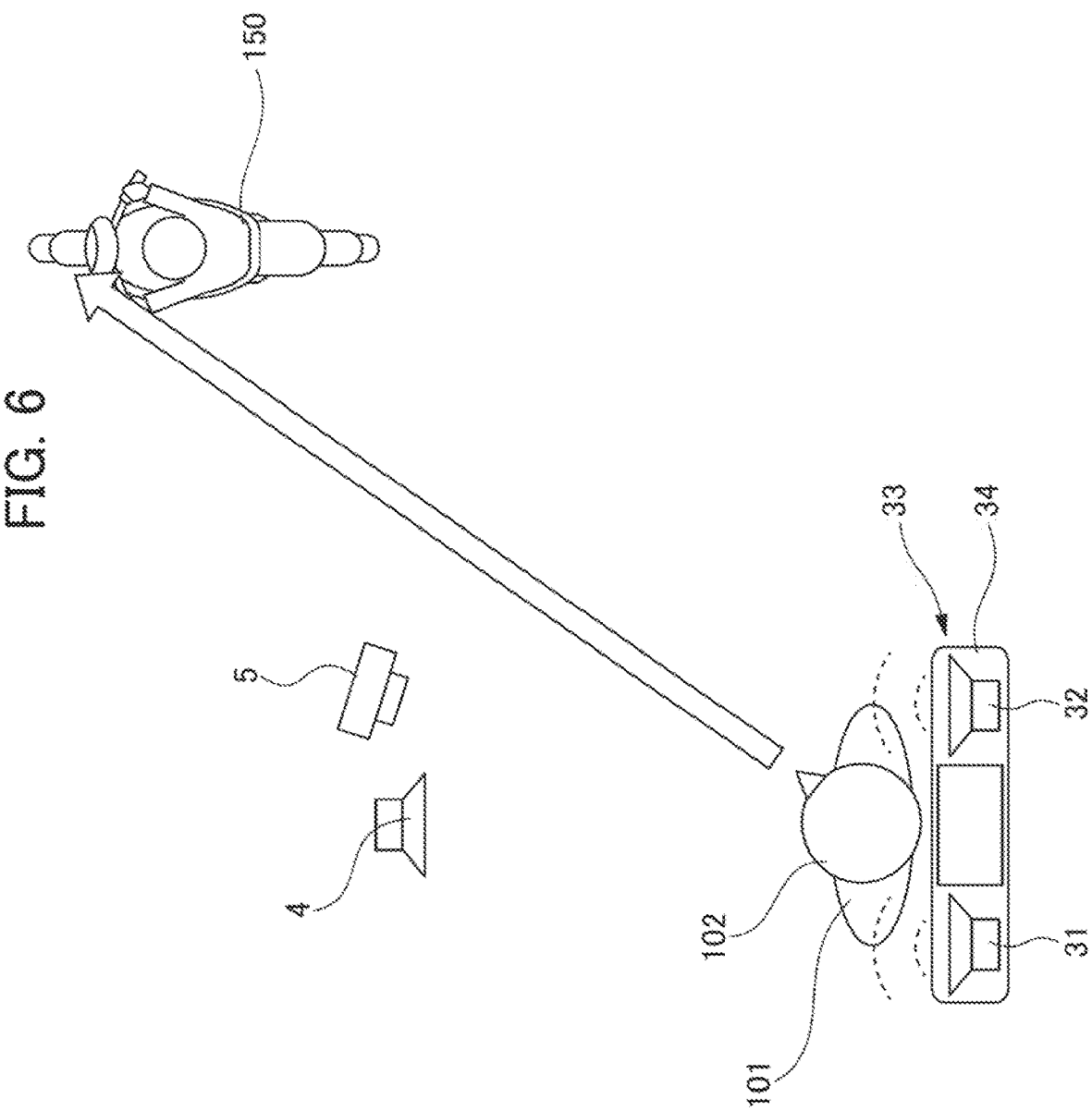
FIG. 6 is a schematic view illustrating the notification processing after the driver has recognized the object in the safety support device according to the present embodiment.

FIG. 6 is a schematic view illustrating the notification processing after the driver 101 has recognized the object 150 in the safety support device 1 according to the present embodiment. As illustrated in FIG. 6, when it is detected that, after a warning sound has been issued, the direction of the sight line of the driver 101 has intersected the object 150 or the expected route of the object 150, the controller 10 performs such processing that causes the issued warning sound to fade out or stop. When the warning sound is a three-dimensional sound, the three-dimensional sound is caused to fade out or stop. When the warning sound is a monaural sound, the monaural sound is caused to fade out or stop.

A three-dimensional sound that the dual-purpose speaker 31 and the dual-purpose speaker 32 output and a monaural sound that the dual-purpose speaker 31, the dual-purpose speaker 32, and the monaural speaker 4 output may each be a sound allowing the position of the object 150 to be sensed, and is not particularly limited. For example, an alarm sound such as a buzzer sound may be used, a verbal sound notifying of a risk may be used, and an engine sound and a traveling sound of a vehicle may be used. Engine sounds and traveling sounds that simulate those of four-wheeled vehicles and two-wheeled vehicles may be set beforehand, and one may be set in accordance with a vehicle identified through analyzing of an image that the object detection camera 21 has captured. Otherwise, a microphone may be disposed as a sound collector in the vehicle 100, and a sound of the object 150 may be outputted in a real-time manner. Furthermore, when the dual-purpose speaker 31, the dual-purpose speaker 32, and the monaural speaker 4 are utilized for playing back a music track or a movie, a warning sound may be outputted while lowering the sound volume of the music track or the movie that has been played back.

Figure 7:
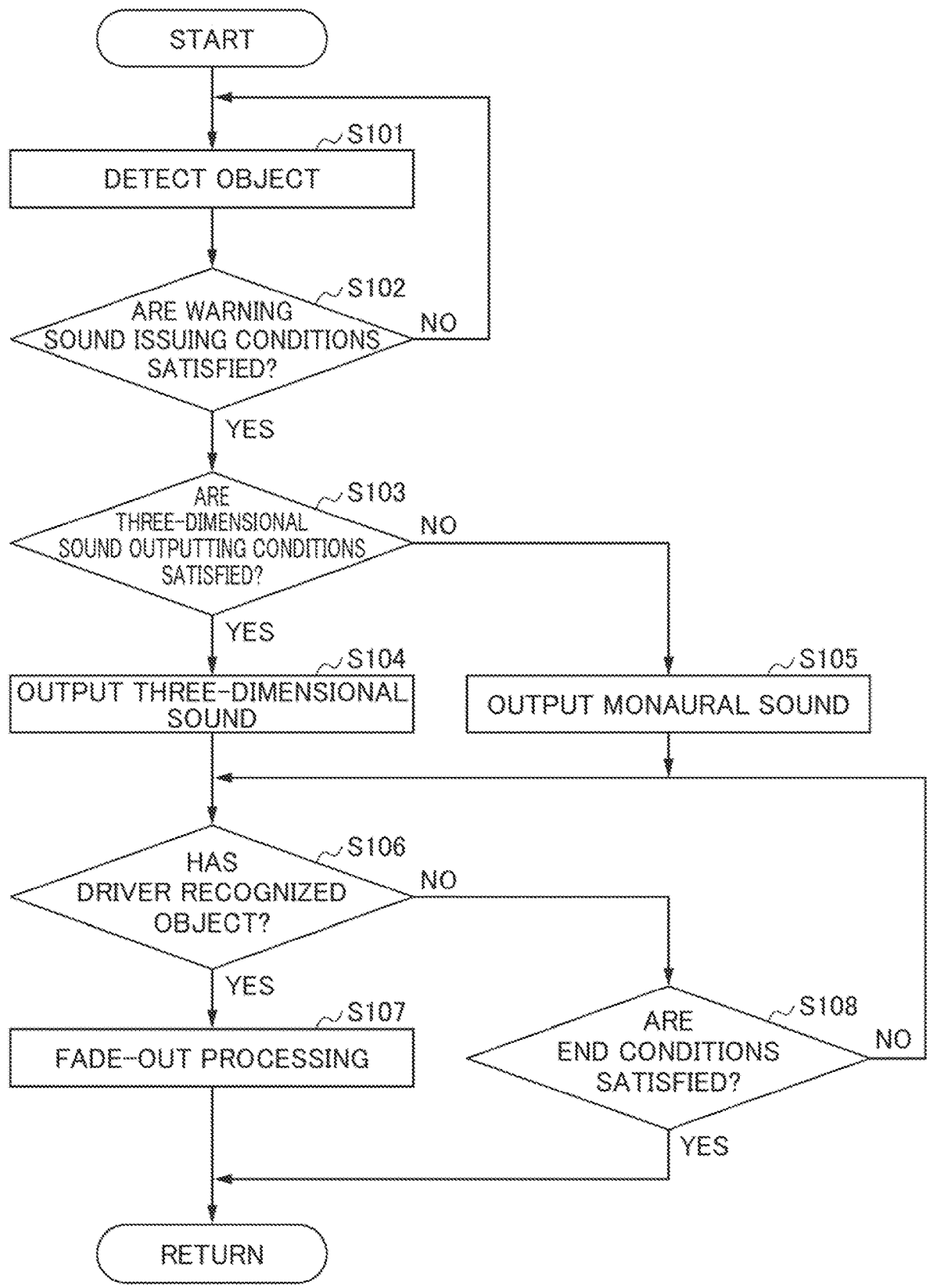
FIG. 7 is a flowchart illustrating the flow of the notification processing performed by the safety support device according to the present embodiment.

Next, the whole flow of the notification processing will now be described below with reference to FIG. 7. FIG. 7 is a flowchart illustrating the flow of the notification processing performed by the safety support device 1 according to the present embodiment. Note that the flowchart described below is a mere example, and it is possible to appropriately change the contents of the processing and the order of the processing.

The controller 10 first executes, with the object detection camera 21, the radar device 22, or both, detection processing for the object 150 lying outside the vehicle 100 (step S101). Next, the controller 10 determines whether warning sound issuing conditions are satisfied (step S102). In the present embodiment, a fact that the position of the object 150 relative to the vehicle 100 may cause a risk that should be notified to the driver 101 and a fact that the driver 101 is not recognizing the object 150 are set as the warning sound issuing conditions.

At step S102, whether the position of the object 150 relative to the vehicle 100 may cause a risk that should be notified to the driver 101 is determined based on, for example, the position, the speed, and the moving direction of the vehicle 100 and the position, the speed, and the moving direction of the object 150. Furthermore, whether the driver 101 is recognizing the object 150 is determined based on, as described above, whether the direction of the sight line of the driver 101 intersects the position of or the expected route of the object 150.

In the processing at step S102, when the detection information acquired from the object detection camera 21, the radar device 22, and the monitoring camera 5 does not satisfy the warning sound issuing conditions, the controller 10 continues the detection processing for the object 150 (step S102; No). In the processing at step S102, when the acquired detection information satisfies the warning sound issuing conditions, the controller 10 causes the processing to proceed to step S103 (step S102; Yes).

At step S103, the controller 10 determines whether the detection information acquired from the monitoring camera 5 satisfies three-dimensional sound outputting conditions. In the present embodiment, when the orientation of the head 102 of the driver 101 lies within the range of the predetermined angle α, the processing is caused to proceed to step S104, and, when the orientation of the head 102 of the driver 101 lies outside the range of the predetermined angle α, the processing is caused to proceed to step S105.

At step S104, the controller 10 controls and causes the dual-purpose speaker 31 and the dual-purpose speaker 32 to output a three-dimensional sound forming a sound image allowing the driver 101 to sense the position of the object 150 (step S104). The controller 10 causes, after outputting the three-dimensional sound as a warning sound, the processing to proceed to step S106.

At step S105, the controller 10 selects, based on the direction of the object 150, one speaker from among the dual-purpose speaker 31, the dual-purpose speaker 32, and the monaural speaker 4 and causes a monaural sound to be outputted (step S105). The controller 10 causes, after outputting the monaural sound as a warning sound, the processing to proceed to step S106.

At step S106, the controller 10 determines whether the driver 101 has recognized the object 150 after outputting the warning sound. In the present embodiment, it is determined whether the direction of the sight line of the driver 101 intersects the position of or the expected route of the object 150.

When it has been determined that the driver 101 has recognized the object 150, the controller 10 causes the processing to proceed to step S107 (step S106; Yes), and executes fade-out processing for the warning sound (step S107). With the fade-out processing, when the warning sound is a three-dimensional sound, its volume is gradually reduced to cause the three-dimensional sound to fade out, and, when the warning sound is a monaural sound that is not a three-dimensional sound, its volume is gradually reduced to cause the monaural sound to fade out. The controller 10 causes, after the fade-out processing, the processing to return to step S101.

When it has not yet been determined that the driver 101 has recognized the object 150, the controller 10 causes the processing to proceed to step S108 (step S106; No), and determines whether end conditions for the warning sound are satisfied. It is possible to set the end conditions for a warning sound. For example, it is possible to set conditions for appropriately ending a warning sound when the object detection camera 21 and the radar device 22 are not able to detect the object 150 that has caused the warning sound to be outputted or when a predetermined period of time has elapsed. When the end conditions have not yet been satisfied, the controller 10 causes the processing to return to step S106 and continues monitoring of the direction of the sight line of the driver 101 (step S108; No). When the end conditions have been satisfied, the controller 10 causes the warning sound to be stopped and causes the processing to return to step S101 (step S108; Yes).

As described above, the safety support device 1 for the vehicle 100, according to the present embodiment includes: the object detection camera 21 and the radar device 22 serving as detectors that detect the position of the object 150 around the vehicle 100; the dual-purpose speaker 31 and the dual-purpose speaker 32 serving as three-dimensional sound outputters that output a three-dimensional sound to allow the driver 101 to sense the direction of the object 150 in which the object 150 exists; the monaural speaker 4 serving as a sound outputter that outputs a sound allowing the driver 101 to sense the existence of the object 150; the monitoring camera 5 serving as a monitor that monitors a change in the positions of the ears of the driver 101; and the controller 10 that controls the dual-purpose speaker 31, the dual-purpose speaker 32, and the monaural speaker 4, based on detection information of the object detection camera 21, the radar device 22, and the monitoring camera 5. The controller 10 selects, in accordance with the positions of the ears of the driver 101, which are detected by the monitoring camera 5, whether to cause the dual-purpose speaker 31 and the dual-purpose speaker 32 to output a three-dimensional sound or to cause the dual-purpose speaker 31, the dual-purpose speaker 32, and the monaural speaker 4 to output a sound.

Thereby, when the ears of the driver 101 lie at appropriate positions, it is possible to separately use a three-dimensional sound that makes it possible to localize a sound image at a desired position and a sound that makes it possible to notify the driver 101 of the existence of an object even when the ears of the driver 101 lie at positions that are not appropriate for using a three-dimensional sound, in accordance with the positions of the ears of the driver 101. Therefore, it is possible to avoid the occurrence of such a situation that a sound image using a three-dimensional sound is not appropriately localized due to the positions of the ears, making it possible to achieve the effective notification processing in accordance with the positions of the ears of the driver 101.

Furthermore, in the present embodiment, a sound that the dual-purpose speaker 31, the dual-purpose speaker 32, and the monaural speaker 4 output is a monaural sound or a stereo sound that is not a three-dimensional sound.

Thereby, since a three-dimensional sound is highly dependent on the three-dimensional sound outputters and the positions of the ears, using a monaural sound or a stereo sound that is not a three-dimensional sound makes it possible to appropriately allow the driver 101 to sense the existence of an object even when the positions of the ears of the driver 101 have significantly changed.

Furthermore, in the present embodiment, the controller 10 causes a three-dimensional sound to be outputted when the orientation of the head 102 of the driver 101, which is detected by the monitoring camera 5, when seen in a plan view lies within the predetermined angle α that is set beforehand and causes a sound to be outputted when the orientation lies outside the predetermined angle α.

Thereby, detecting a change in the positions of the ears based on the angle of the orientation of the head 102 makes it possible to appropriately perform switching between a three-dimensional sound and a sound.

Furthermore, in the present embodiment, the dual-purpose speaker 31 and the dual-purpose speaker 32 are respectively provided, on the left side and the right side, with respect to the driver 101, to the backrest or the headrest 34 of the seat 33 for the driver 101.

Thereby, since the three-dimensional sound outputters are respectively disposed at the positions closer to the ears of the driver 101, it is possible to more accurately present a three-dimensional sound to the driver 101.

Furthermore, in the present embodiment, a plurality of speakers, i.e., the dual-purpose speaker 31 and the dual-purpose speaker 32, simultaneously output and present a three-dimensional sound, and the dual-purpose speaker 31 and the dual-purpose speaker 32 serve as sound outputters that output a monaural sound or a stereo sound, instead of a three-dimensional sound.

Thereby, it is possible to reduce the number of speakers for a monaural sound, which do not output a three-dimensional sound, making it possible to achieve reductions in manufacturing cost and in a space necessary for achieving such a safety support device.

Furthermore, in the present embodiment, the speaker is provided in plural number, i.e., the dual-purpose speaker 31, the dual-purpose speaker 32, and the monaural speaker 4 are provided in different directions when seen from the driver 101, and the controller 10 selects one speaker corresponding to the direction of the object 150 from among the dual-purpose speaker 31, the dual-purpose speaker 32, and the monaural speaker 4 and causes a sound to be outputted.

Thereby, even when no three-dimensional sound is used, it is possible to allow the driver 101 to sense the feel of the direction of the object 150 from any one of the dual-purpose speaker 31, the dual-purpose speaker 32, and the monaural speaker 4, which corresponds to the direction of the object 150.

Furthermore, in the safety support device 1 according to the present embodiment, the monitoring camera 5 achieves a function of a sight line monitor that monitors the direction of the sight line of the driver 101, in which the controller 10 determines, based on detection information of the object detection camera 21, the radar device 22, and the monitoring camera 5, whether the driver 101 is visually recognizing the object 150, and, when it is determined that the driver 101 is visually recognizing the object, reduces or stops the outputting of the three-dimensional sound or the sound.

Thereby, since it is not necessary, when the driver 101 is recognizing the object 150, to present its existence to the driver 101, a three-dimensional sound and a sound that are less necessary for the driver 101 will not be outputted, making it possible to reduce inconveniences.

In the embodiment described above, an example has been described where, when outputting a monaural sound as a sound that is not a three-dimensional sound, one speaker is selected based on the direction of the object 150. However, the present invention is not limited to this configuration. Such a configuration may be applied in which two speakers used to output a stereo sound may be selected from among three or more speakers based on the direction of an object.

In the embodiment described above, the dual-purpose speaker 31 and the dual-purpose speaker 32 are configured to be able to output both a three-dimensional sound and a sound. However, the present invention is not limited to this configuration. The dual-purpose speaker 31 and the dual-purpose speaker 32 may be dedicated for a three-dimensional sound only.

In addition to those described above, it is possible to appropriately replace a component in the embodiment described above with another known component without departing from the scope of the present invention. Furthermore, such modification examples as described above may be appropriately combined with each other.

EXPLANATION OF REFERENCE NUMERALS

1 Safety support device
4 Monaural speaker (sound outputter)
5 Monitoring camera (monitor, sight line monitor)
10 Controller
21 Object detection camera (detector)
22 Radar device (detector)
31, 32 Dual-purpose speaker (three-dimensional sound outputter)

What is claimed is:

1. A safety support device for a vehicle, comprising:
a detector that detects a position of an object around the vehicle;
three-dimensional sound outputters that output a three-dimensional sound to allow a driver to sense a direction in which the object exists;
a sound outputter that outputs a sound allowing the driver to sense the existence of the object;
a monitor that monitors a change in positions of ears of the driver; and
a controller that controls the three-dimensional sound outputters and the sound outputter, based on detection information of the detector and the monitor,
wherein the controller selects, in accordance with the positions of the ears of the driver, the positions being detected by the monitor, whether to cause the three-dimensional sound outputters to output the three-dimensional sound or to cause the sound outputter to output the sound.

2. The safety support device according to claim 1, wherein the sound that the sound outputter outputs is a monaural sound or a stereo sound that is not a three-dimensional sound.

3. The safety support device according to claim 1, wherein the controller causes the three-dimensional sound to be outputted when an orientation of a head of the driver, the orientation being detected by the monitor, when seen in a plan view lies within a predetermined angle that is set beforehand and causes the sound to be outputted when the orientation lies outside the predetermined angle.

4. The safety support device according to claim 1, wherein the three-dimensional sound outputters are respectively provided, on a left side and a right side, with respect to the driver, to a backrest or a headrest of a seat for the driver.

5. The safety support device according to claim 1, wherein the plurality of three-dimensional sound outputters simultaneously output and present the three-dimensional sound, and
the three-dimensional sound outputters each also serve as the sound outputter that outputs the sound, instead of the three-dimensional sound.

6. The safety support device according to claim 1, wherein the sound outputter is provided in plural number in different directions when seen from the driver, and
the controller selects one sound outputter corresponding to a direction of the object from among the plurality of sound outputters to output the sound.

7. The safety support device according to claim 1,
further comprising a sight line monitor that monitors a direction of a sight line of the driver,
wherein the controller determines, based on detection information of the detector and the sight line monitor, whether the driver is visually recognizing the object, and, when it is determined that the driver is visually recognizing the object, reduces or stops the outputting of the three-dimensional sound or the sound.

\* \* \* \* \*